(12) United States Patent
Winjum et al.

(10) Patent No.: US 7,424,513 B2
(45) Date of Patent: Sep. 9, 2008

(54) DECOUPLING AN ATTACHMENT FROM AN ELECTRONIC MESSAGE THAT INCLUDED THE ATTACHMENT

(75) Inventors: Randy Knight Winjum, Vashon, WA (US); Gail Borod Giacobbe, Seattle, WA (US); Bryan T. Starbuck, Redmond, WA (US); John Heinrich Lueders, Seattle, WA (US); Alexander E. Vaschillo, Redmond, WA (US); Stephen T. Wells, Seattle, WA (US); Robert C. Combs, Redmond, WA (US); Sridhar Sundararaman, Bellevue, WA (US); Raghavendra Rachamadugu, Hyderabad (IN); Hubert Louis Marie Van Hoof, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 942 days.

(21) Appl. No.: 10/693,547

(22) Filed: Oct. 23, 2003

(65) Prior Publication Data

US 2005/0102361 A1 May 12, 2005

(51) Int. Cl.
*G06F 15/16* (2006.01)
*G06F 12/00* (2006.01)
*G06F 17/30* (2006.01)

(52) U.S. Cl. .................. 709/205; 709/203; 709/204; 709/206; 709/207; 707/205

(58) Field of Classification Search ......... 709/202–207; 707/205
See application file for complete search history.

(56) References Cited

U.S. PATENT DOCUMENTS 5,781,901 A    7/1998    Kuzma (Continued)

OTHER PUBLICATIONS

Zhuoqing, M.M. Katz, R., *Achieving Service Portability Using Self-Adaptive Data Paths*, California University, Berkeley, C.A., Jan. 2002.

(Continued)

*Primary Examiner*—Saleh Najjar
*Assistant Examiner*—Asad M Nawaz
(74) *Attorney, Agent, or Firm*—Workman Nydegger

(57) ABSTRACT

The present invention extends to methods, systems, computer program products, and data structures for decoupling an attachment from an electronic message that included the attachment. Generally, data fields of electronic messages and attachments are created in accordance with an electronic message schema hierarchy. Attachments are configured to have a data field indicating if the attachment is to persist when a corresponding electronic message is deleted. When an attachment persists, a user may be able to locate and use the attachment after a corresponding electronic message has been deleted (even if the attachment has not been expressly saved). Attachments are configured to include attachment metadata indicating properties of an electronic message that included the attachment. Accordingly, a user can access information (e.g., sender, subject, date, etc) associated with an electronic message (e.g., that included the attachment) even after the electronic message has been deleted.

16 Claims, 5 Drawing Sheets

U.S. PATENT DOCUMENTS

| | | | |
|---|---|---|---|
| 6,324,569 B1* | 11/2001 | Ogilvie et al. | 709/206 |
| 6,430,174 B1 | 8/2002 | Jennings | |
| 6,430,177 B1 | 8/2002 | Luzeski | |
| 6,487,278 B1 | 11/2002 | Skladman | |
| 6,493,703 B1 | 12/2002 | Knight et al. | 707/3 |
| 6,549,612 B2 | 4/2003 | Gifford | |
| 6,738,800 B1 | 5/2004 | Aquilon | |
| 6,778,642 B1 | 8/2004 | Schmidt | |
| 6,816,885 B1* | 11/2004 | Raghunandan | 709/206 |
| 6,990,513 B2 | 1/2006 | Belfiore | |
| 7,003,551 B2* | 2/2006 | Malik | 709/206 |
| 7,116,766 B2 | 10/2006 | Owens | |
| 7,119,918 B2 | 10/2006 | Toyoda | |
| 7,171,432 B2 | 1/2007 | Wildhahen | |
| 7,194,516 B2* | 3/2007 | Giacobbe et al. | 709/206 |
| 7,263,698 B2 | 8/2007 | Wildhahen | |
| 7,296,058 B2* | 11/2007 | Throop | 709/206 |
| 2001/0054073 A1* | 12/2001 | Ruppert et al. | 709/206 |
| 2002/0013817 A1 | 1/2002 | Collins | |
| 2002/0065892 A1* | 5/2002 | Malik | 709/206 |
| 2002/0145057 A1* | 10/2002 | Leedy et al. | 239/310 |
| 2002/0178353 A1 | 11/2002 | Graham | |
| 2003/0018644 A1 | 1/2003 | Bala et al. | 707/100 |
| 2003/0018721 A1 | 1/2003 | Gupta | |
| 2003/0088704 A1 | 5/2003 | Mertama | |
| 2003/0093565 A1 | 5/2003 | Berger | |
| 2003/0105712 A1 | 6/2003 | Bodensohn | |
| 2004/0044703 A1 | 3/2004 | Wildhahen | |
| 2004/0044998 A1 | 3/2004 | Wildhahen | |
| 2004/0109197 A1 | 6/2004 | Gardaz | |
| 2004/0133645 A1* | 7/2004 | Massanelli et al | 709/206 |
| 2004/0133646 A1 | 7/2004 | Leukert-Knapp | |
| 2004/0143569 A1 | 7/2004 | Gross | |
| 2004/0181467 A1 | 9/2004 | Raiyani | |
| 2004/0203664 A1 | 10/2004 | Lei | |
| 2004/0229595 A1 | 11/2004 | Laursen | |
| 2004/0237042 A1 | 11/2004 | Murray et al. | 715/530 |
| 2004/0243926 A1 | 12/2004 | Trenbeath | |
| 2005/0033811 A1 | 2/2005 | Bhogal | |
| 2005/0033813 A1 | 2/2005 | Bhogal | |
| 2005/0060317 A1 | 3/2005 | Lott et al. | 707/10 |
| 2005/0060375 A1* | 3/2005 | Ernest et al. | 709/206 |
| 2005/0108332 A1* | 5/2005 | Vaschillo et al. | 709/206 |
| 2006/0089931 A1 | 4/2006 | Giacobbe | |
| 2006/0095527 A1* | 5/2006 | Malik | 709/206 |
| 2007/0208802 A1 | 9/2007 | Barman | |

OTHER PUBLICATIONS

Raman, B., Katz, R.H., Joseph, A.D., *University Inbox: Providing Extensible Personal Mobility and Service Mobility In An Integrated Communication Network*, Div. of Comput. Sci., California University, Berkeley, C.A., 2000.

U.S. Appl. No. 10/692,201, filed Oct. 23, 2003, Giacobbe, et al.

U.S. Appl. No. 10/971,403, filed Oct. 22, 2004, Giacobbe, et al.

U.S. Appl. No. 10/835,822, filed Apr. 30, 2004, Starbuck, et al.

Office Action mailed Jun. 27, 2007 cited in related case U.S. Appl. No. 10/971,403.

Office Action dated Dec. 31, 2007 cited in related U.S. Appl. No. 10/835,822.

* cited by examiner

DECOUPLING AN ATTACHMENT FROM AN ELECTRONIC MESSAGE THAT INCLUDED THE ATTACHMENT

BACKGROUND OF THE INVENTION

1. The Field of the Invention

The present invention relates to electronic messaging and, more particularly, to decoupling an attachment from the electronic message that included the attachment.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, web browsing) include electronic communication between a number of computer systems and/or other electronic devices via wired and/or wireless computer networks.

In particular, electronic messaging has become an important method for communicating. Computer system users often send and receive electronic messages (e.g., electronic mail messages, instant messages, faxes, news group postings, etc.,) to exchange information with one another. For example, to create an electronic mail message, a sending user typically selects a new message option from within an electronic mail application. In response to the selection, the electronic mail application displays one or more fields (e.g., a To field, a Body field, etc.) that can receive user entered data. The sending user then enters data (e.g., at a keyboard) into the displayed fields. When appropriate, the sending user can save the electronic mail message as a draft or send the electronic mail message to a recipient user (e.g., by selecting the appropriate "save" or "send" control within the electronic mail application).

Sending the electronic mail message may cause the electronic mail message to be routed from the sending user's computer system, through a sending mail server, across a network, to a receiving mail server that stores electronic mail messages for a recipient user. To view the electronic mail message, the recipient user establishes a connection from an electronic mail application to the receiving mail server. Establishing the connection can cause all electronic mail messages sent to the recipient user, including the mail message from the sending user, to be transferred from the receiving mail server to the recipient user's computer system and stored at the recipient user's computer system. After the electronic mail message from the sending user is transferred and stored, the recipient user may manipulate an input device, such as, for example, a mouse, within the electronic mail application to view the stored electronic mail message.

Electronic messages are also frequently used to send files (word processing documents, pictures, etc) from one user to another. A user desiring to send a file can attach the file to an electronic message. When the electronic message is transferred, the attached file is transferred along with the electronic message. Thus, it may be that an electronic message includes a message body (e.g., text included in an electronic mail message) and an attachment (or attachments).

When an electronic message including an attachment is transferred to a recipient's computer system, the attachment can be stored at the recipient's computer system along with a corresponding message body. When the recipient accesses the electronic message, an icon representing the attachment is typically presented to the recipient. Accordingly, the recipient can then select the icon to access the attachment. The recipient may also choose to save a copy of the attachment to location on a mass storage device associated with the recipient's computer system.

An attachment is typically coupled to an electronic message that includes the attachment. That is, when the electronic message is moved to a storage location or deleted, the attachment is typically also moved to the storage location or deleted. Coupling attachments and electronic messages can allow a user to easily manipulate the electronic message and attachment together. Unfortunately, if for some reason a user does not save an attachment before deleting a corresponding electronic message, it can be difficult, if not impossible, to recover the attachment. Further, it is often difficult to locate attachments. For example, a saved attachment may be stored in an obscure location used by an electronic messaging application. Additionally, even when an attachment can be located, the attachment typically does not provide any message related data associated with an electronic message. For example, there may be no way to determine who sent the attachment or when the attachment was sent. Therefore systems, methods, computer program products, and data structures for decoupling an attachment from an electronic message that included the attachment would be advantageous.

BRIEF SUMMARY OF THE INVENTION

The foregoing problems with the prior state of the art are overcome by the principles of the present invention, which are directed towards methods, systems, computer program products, and data structures decoupling an attachment from an electronic message that included the attachment. Generally, data fields of electronic messages and attachments are created in accordance with an electronic message schema hierarchy. Attachments to electronic messages are configured to have a data field indicating if the attachment is to persist when a corresponding electronic message is deleted. When an attachment persists, a user may be able to locate and use the attachment even after a corresponding electronic message has been deleted (even if the attachment has not been expressly saved). Further, attachments to electronic messages are configured to include attachment metadata indicating properties of an electronic message that included the attachment. Accordingly, an attachment can be queried for message related data (e.g., sender, subject, date, etc) related to the electronic message that included the attachment even after the electronic message has been deleted.

A computer system receives a body portion of an electronic message and receives an attachment associated with the electronic message. For example, the computer system can receive an electronic mail message that includes an attached file (e.g., a word processing document, music file, etc.). The computer system receives a delete command requesting deletion of the electronic message. For example, the computer system can receive a deletion command in response to user input at a messaging application. The computer system deletes the body portion of the electronic message in accordance with the received deleted command.

The computer system refers to a data field of the attachment to determine if the attachment is to be deleted. For example, an attachment can include an IsPinned field having a value that indicates whether or not the attachment is to persist when the electronic message is deleted. When the value indicates that the attachment is to persist, the attachment is not deleted. On the other hand, when the value indicates that the attachment is not to persist, the attachment can be deleted in accordance with the delete command. When an attachment is deleted, attachment metadata associated with the attachment can also be deleted.

In some embodiments, an attachment is identified in response to a message related query not withstanding that an electronic message associated with the attachment no longer exists (e.g., the electronic message has been deleted). A computer system receives a query for message related data that satisfies query criteria. For example, the computer system can receive a query for all message related data associated with a specified sending entity (e.g., all messages From a specified user). If an attachment was included in an electronic message form the specified sending entity, the attachment can be identified in response to the query even if the electronic message has been deleted. The computer system can compare query criteria to metadata values of the attachment to determine if the attachment satisfies the query criteria. The computer system can return at least a link to the attachment in response to the query.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
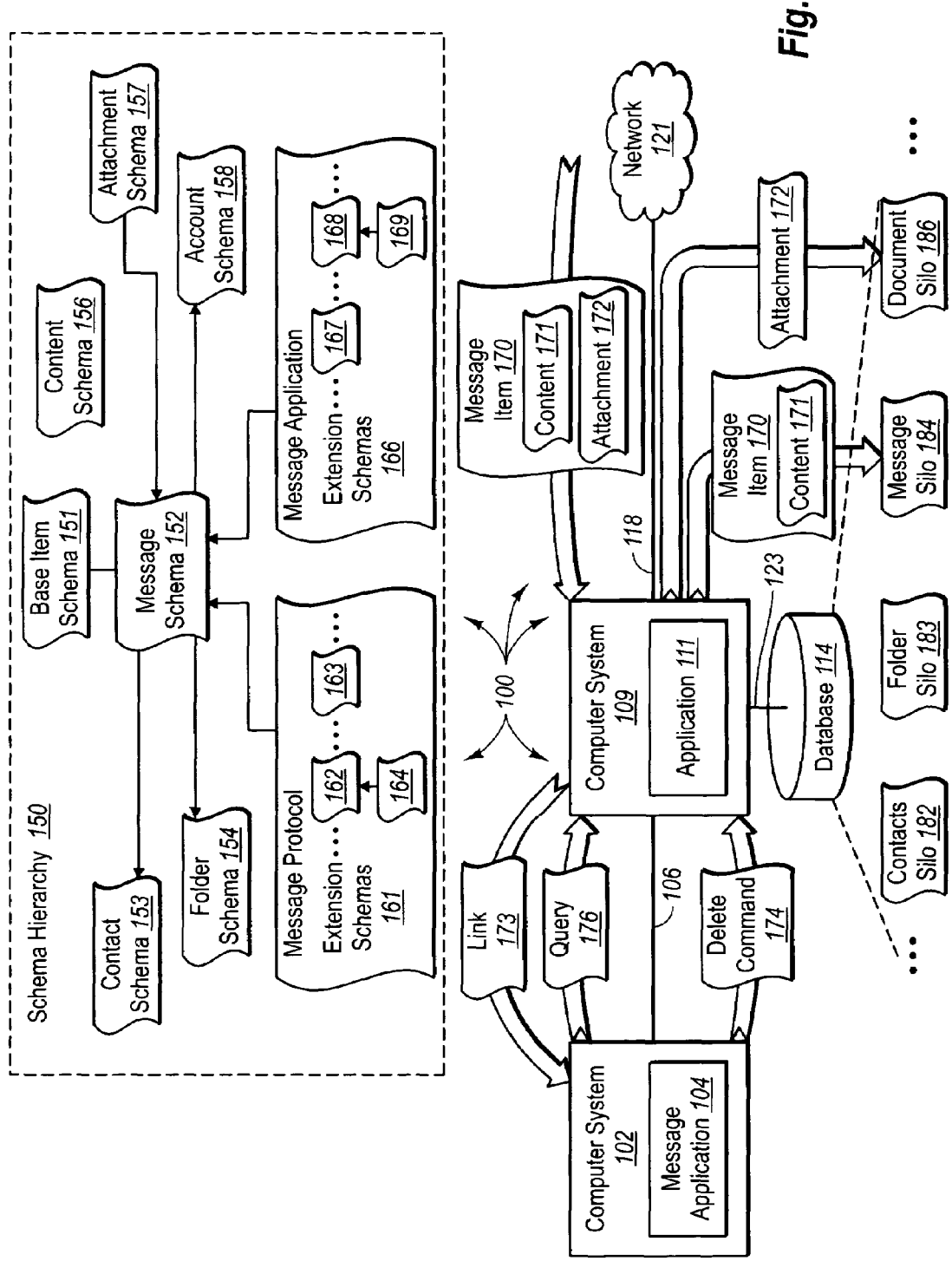
FIG. 1 illustrates an example of a network architecture and general schema hierarchy that facilitate decoupling an attachment from an electronic message that included the attachment in accordance with the principles of the presenting invention.

The principles of the present invention provide for decoupling an attachment from an electronic message that included the attachment. Generally, data fields of electronic messages and attachments are created in accordance with an electronic message schema hierarchy. Attachments are configured to have a data field indicating if the attachment is to persist when a corresponding electronic message is deleted. When an attachment persists, a user may be able to locate and use the attachment after a corresponding electronic message has been deleted (even if the attachment has not been expressly saved). Attachments are configured to include attachment metadata indicating properties of an electronic message that included the attachment. Accordingly, a user can access information (e.g., sender, subject, date, etc) associated with an electronic message (e.g., that included the attachment) even after the electronic message has been deleted.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "schema" is defined as an expression of a shared vocabulary between a plurality of computer systems that allows the plurality of computer systems to process documents according the expressed shared vocabulary. For example, an eXtensible Markup Language ("XML") schema can define and describe a class of XML documents using schema constructs (e.g., name/value pairs) of an XML schema language. These schema constructs can be used to constrain and document the meaning, usage, and relationships of data types, elements and their content, attributes and their values, entities and their contents, and notations, as used in XML documents. Thus, any computer system that can access an XML schema can process XML documents in accordance with the XML schema. Further, any computer system that can access an XML schema can compose or modify XML documents for use by other computer systems and/or message processors that can also access the XML schema.

Schema is defined to include Document Type Definitions ("DTD"), such as, for example, DTD files ending with a ".dtd" extension. Schema is also defined to include World Wide Web Consortium ("W3C") XML Schemas, such as, for example, XML Schema files ending with a ".xsd" extension. However, the actual file extension for a particular DTD or XML schema is not important. A schema can be utilized to define virtually any data type including logical, binary, octal, decimal, hexadecimal, integer, floating-point, character, character string, user-defined data types, and combinations of these data types used to defined data structures. Some examples of user-defined data types are DateTime data types representing date and time data and EAddress data types representing electronic addresses data, such as, for example, telephone numbers, electronic mail address, instant message addresses, etc. A schema can also be defined to reference or link to other schemas in a schema hierarchy.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a network architecture 100 and general schema hierarchy 150 that facilitate efficiently decoupling an attachment from an electronic message that included the attachment in accordance with the principles of the present invention. Network architecture 100 includes computer system 102, computer system 109, database 114, and network 121. Computer system 102 and computer system 109 are connected by corresponding link 106. Computer system 102 and computer system 109 can exchange electronic messages (e.g., electronic mail messages, instant messages, fax messages, news group postings, voice messages, etc.) over link 106. For example, it may be that computer system 109 is a messaging server that stores electronic messages. From time to time computer system 102 may connect to computer system 109 to download electronic messages.

Computer system 109 is connected to database 114 by link 123. Database 114 can be a database that stores a plurality of different types of database items. For example, contacts silo 182 can store contact items representing contacts (e.g., individual, organizations, or corporations), folder silo 183 can store folder items representing folders that store other types of items (e.g., electronic messages), message silo 184 can store message items representing electronic messages, document silo 186 can store document items representing various documents, etc. Database items stored in database 114 can include data fields defined in accordance with the schemas of schema hierarchy 150. A series of three periods (an ellipsis) before contacts silo 182 and after document silo 186 indicates that other silos (potentially storing other different types database items) can be included in database 114.

Computer system 109 is connected to network 121 by link 118. Network 121 can be a Local Area Network ("LAN"), Wide Area Network ("WAN"), or even the Internet. Computer system 109 can receive data from and send data to other computer systems connected to network 121 over link 118. Computer system 102, computer system 109, and possibly other computer systems connected to network 121 can have access to schemas included in schema hierarchy 150.

Schema hierarchy 150 generally represents data formats for defining electronic messages. Message items representing electronic messages (as well as other types of items in database 114) can be defined in accordance with base item schema 151. Generally, a base item schema can define data formats for data fields (e.g., a globally unique ID and display name) used to differentiate one database item from another database item. Accordingly, message items stored in message silo 184 (as well as items stored contacts silo 182, folder silo 183, and document silo 186) can include one or more data fields defined in accordance with base item schema 151.

Message schema 152 defines data formats for one or more data fields (e.g., message subject, message size, etc.) that are common to a plurality of different types of electronic messages (e.g., electronic mail message, instant message, news group posting, blog entry, fax message, voice mail message, etc). Accordingly, message items stored in message silo 184 can include one or more data fields defined in accordance with message schema 152. Message schema 152 can define data fields that refer or linked to data fields defined in accordance with other schemas in schema hierarchy 150.

For example, message schema 152 can define one or more data fields that refer or link to contact related information (having data fields defined in accordance with contact schema 153) in contacts silo 182. Accordingly, a message item defined in accordance with message schema 152 can refer or link to contacts related information in silo 182. Referring to or linking to contact related information can indicate that the entity corresponding to the contact related information is associated with the message item. Similarly, message schema 152 can define one or more data fields that refer or link to a folder related information (having data fields defined in accordance with contact schema 153) in folders silo 183. Accordingly, a message item defined in accordance with message schema 152 can also refer or link to folder related information in folder silo 183. Referring to or linking to a folder related information can indicate that the message item is stored in a folder corresponding to the folder related data.

Likewise, message schema 152 can define one or more data fields that refer to link to document related information. Accordingly, a message item defined in accordance with schema 152 can include one or more attachments (having data fields defined in accordance with attachment schema 157) that refer to link to document related data in document silo

186. Referring to or linking to document related data can indicate that the documents corresponding to the document related data was an attachment to the message item. Further, a message item defined in accordance with message schema 152 can refer or link to account related data defined in accordance with account schema 158. The content of a message item (e.g. a message body or message attachment) can include data fields defined in accordance with content schema 156.

A message item defined in accordance with schema 152 can also include data fields defined in accordance with one or more message extensions schemas. Some message extension schemas can be protocol extensions that promote compatibility with specified message protocols. For example, message protocol extension schemas 161 can contain one or more message protocol extension schemas defining data fields that are specific to particular message protocols. For example, protocol extension schema 162 can define data formats for one or more data fields specific to a first message protocol (e.g., Network News Transfer Protocol ("NTTP")) and protocol extension schema 163 can define data formats for one or more data fields specific to a second message protocol (e.g., Post Office Protocol ("POP")). Protocol extension schemas can be arranged hierarchy. For example, protocol extension schema 164 can define data formats for additional data fields specific to a particular implementation of the first message protocol (having data fields defined in accordance with protocol extension schema 162).

Other message extensions can be application extensions that promote compatibility with specified message applications. For example, message application extension schemas 166 can contain one or more message application extension schemas defining data fields that are specific to message applications. For example, application extension schema 167 can define data formats for one or more data fields specific to a first message application (e.g., an electronic mail application) and application extension protocol schema 168 can define data formats for one or more data fields specific to a second message application (e.g., fax application). Application extension schemas can be arranged hierarchy. For example, application extension schema 169 can define data formats for additional data fields specific to a particular version of the second message application (having data fields defined in accordance with application extension schema 168).

Accordingly, an electronic message can have some fields in common with other electronic messages and some fields that differ from other electronic messages. That is, a message item having data fields defined in accordance with message schema 152 can also have additional data fields defined in accordance with any of the extension schemas in message protocol extension schemas 161 and message application extension schemas 166. Data fields corresponding to message extensions can be "snapped" on to and removed from message items as appropriate to facilitate compatibility with existing message protocols and message applications. Accordingly, the configuration of data fields contained in a message item can change over time. Having some commonly defined fields and other differently defined fields promotes efficient storage and access of electronic messages, while also facilitating message compatibility with existing message protocols and message applications.

An application, such as, for example, application 111 (a database interface module), may request that data fields of a particular protocol extension schema or application extension schema be snapped on to or removed from a message item before accessing the message item. Thus, it may be that a message item is transformed for compatibility with a particular message protocol or message application. For example, application 111 may request that fields of the NNTP protocol extension schema be snapped onto message item 170 Accordingly, application 111 can retrieve message item 170 and transform message item 170 to include data fields (e.g., defined in accordance with protocol extension schema 162) that promote compatibly with the NNTP protocol. The transformed message item can then be transferred to computer system 102 or stored in database 114.

Figure 2:
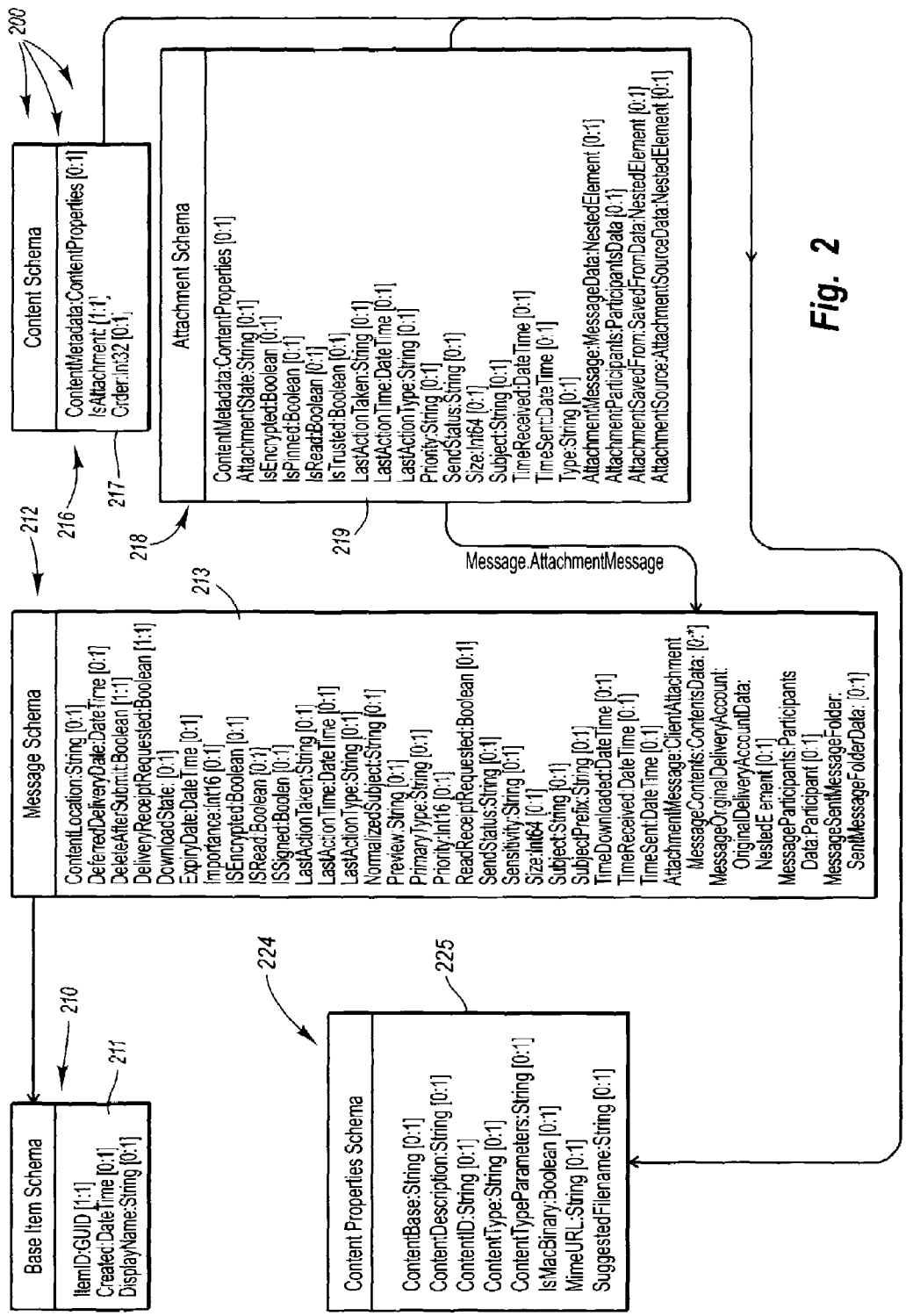
FIG. 2 illustrates an example portion of a more detailed schema hierarchy in accordance with the principles of the present invention.

FIG. 2 illustrate an example portion of a more detailed schema hierarchy 200 in accordance with the principles of the present invention. Depicted in FIG. 2, schema hierarchy 200 includes base item schema 210. Base item schema 210 includes interrelated fields 211 that define data formats for representing base item data. More specifically, interrelated fields 211 can define data formats as described in Table 1.

TABLE 1

| Field Name | Field Data Type | Field Description |
| --- | --- | --- |
| ItemID | GUID | Defines a format for representing a globally unique identifier for a database item. |
| Created | DateTime | Defines a format for indicating the date and time a database item, having a globally unique identifier defined in accordance with the ItemID field, was created. |
| DisplayName | String | Defines a format for indicating a descriptive name for a database item having a globally unique identifier defined in accordance with the ItemID. |

Depicted in FIG. 2, schema hierarchy 200 includes message schema 212. Message schema 212 derives from base item schema 210 and also includes interrelated fields 213 that define data formats for representing a message item. The fields of message schema 212 can be applied to a base item having a globally unique identifier (defined in base item schema 210) to cause the base item to exhibit the properties of a message item. More specifically, interrelated fields 213 can define data formats as described in Table 2.

TABLE 2

| Field Name | Field Data Type | Field Description |
|---|---|---|
| ContentLocation | String | Defines a format for representing referenced content from a message's Content-Location header. This field can be used along with the base Content-Location. Some attachments will have relative Content-Locations to this Content-Location. |
| DeferredSendTime | DateTime | Defines a format for representing the date and time when the message is to be delivered. |
| DeleteAfterSubmnit | Booelan | Defines a format for indicating whether the message should be deleted after being submitted for delivery. |
| DownloadState | String | Defines a format for representing the different phases of downloading the message from the server. Partial, etc. |
| ExpiryDate | DateTime | Defines a format for representing the date and time when the content of the message expires. In general, no automatic action is implied. |
| Importance | Int16 | Defines a format for representing the message sender's opinion of the importance of the message. Corresponds with the "Importance:" field in SMTP. Possible values are 1 ("Low"), 2 ("Normal"), and 3 ("High"). The default value for new messages is 2 ("Normal"). |
| IsEncrypted | Boolean | Defines a format for indicating if the message is encrypted. |
| IsRead | Boolean | Defines a format for indicating if the message has been marked as read by the user. |
| IsSigned | Boolean | Defines a format for indicating if the message has been signed. |
| LastActionTaken | String | Defines a format for representing the last action taken on the message. Possible values are: Replied and Forwarded. |
| LastActionTime | DateTime | Defines a format for representing the date and time at which the last action was taken on the message. |
| LastActionType | String | Defines a format for representing the type of last action taken on this message. Should be interpreted together with LastActionTaken. Examples are: Fax or Email to mark that we replied by fax or email. |
| NormalizedSubjet | String | Defines a format for representing the normalized subject of the message. The NormalizedSubject is the part the subject following the prefix. If there is no prefix, NormalizedSubject is the same as the subject. |
| Preview | String | Defines a format for representing a preview of the message. The preview property can contain the first few characters of the main message body, or some representation of it that will be used for previewing the message. This is cache-optimization field. It is calculated form the bodies and is put here for fast retrieval in preview scenarios. It is text only field and is not mandatory. |
| PrimaryType | String | Defines a format for representing a message type (e.g., Email, FaxMessage, InstantMessage, VoiceMessage, MeetingRequest, etc.) associatd with the message. The message type will imply behavior of the message. Applications can customize icons and read custom headers based on the message type. This value can come from the X-MessageType header. |
| Priority | Int16 | Defines a format for representing a message priority for the message. Message priority for delivery as set by application. Values: AboveNormal = 3, Normal = 2, BelowNormal = 1. Higher values indicate that a transport should deliver it sooner than messages of a lower level. |
| ReadReceiptRequested | Boolean | Defines a format for indicating if read receipt has been requested for this message. |
| SendStatus | String | Defines a format for representing a send status of the message. "ToSend": Compose UI marks this way for transports to pick up. "Sending": A transport transitions from "ToSend" to "Sending" so other transports won't also attempt to send the message. "Sent": The transport transitions from "Sending" to "Sent" after the send is complete. |
| Sensitivity | String | Defines a format indicating the message sender's opinion of the sensitivity of the message. Corresponds with the "Sensitivity:" field in SMTP. Possible values are: None (no special sensitivity), |

TABLE 2-continued

| Field Name | Field Data Type | Field Description |
|---|---|---|
| | | Personal, Private, or Company-Confidential. The default value for new messages is None. |
| Size | Int64 | Defines a format for representing the calculated size of the message in bytes. This includes the entire message with body, header and attachments. The can be missing if the size is unknown. |
| Subject | String | Defines a format for representing the subject of the message. For example, one line that describes the topic of the message. This field is calculated from NormalizedSubject and SubjectPrefix. Subject of the message. Subject can be computed from the Subject and SubjectPrefix values in the following manner: (1) If SubjectPrefix is present, Subject is set to the contents of the NormalizedSubject with the prefix prepended. (2) If SubjectPrefix is not present, NormalizedSubject is copied to Subject. |
| SubjectPrefix | String | Defines a format for representing a SubjectPrefix of the message. Consists of one or more alphanumeric characters, followed by a colon and a space (which are part of the prefix). The subject prefix may be absent. If SubjectPrefix is set express; y, it can be of any length and use any alphanumeric characters and can match a substring at the beginning of the subject. If SubjectPrefix is not expressly set and must be computed by, its contents can be more restricted. One possible rule for computing the prefix is that the subject begin with one, two, or three letters (alphabetic only) followed by a colon and a space. If such a substring is found at the beginning of the subject, it then becomes SubjectPrefix (and also stays at the beginning of the Subject field). Otherwise SubjectPrefix remains unset. |
| TimeDownloaded | DateTime | Defines a format for representing the date and time the message was downloaded from the server. |
| TimeReceived | DateTime | Defines a format for representing the date and time the message was delivered. The TimeReceived property describes the time the message was received by the server, rather than the time the message was downloaded from the server and placed in the local WinFS store. This value can be omitted on draft messages and retained copies of send messages. |
| TimeSent | DateTime | Defines a format for representing the date and time the message sender submitted the message. On draft messages this value can be omitted- it will be set when the message is submitted. |
| Attachment Message | Attachment | Defines a format for representing a link to attachment data corresponding to the message. The attachment data can be defined in accordance with an attachment schema. |
| MessageContents | ContentsData | Defines a format for representing link to a portion of message content corresponding to the message. The portion of message content can be defined in accordance with a content schema. |
| MessageOriginal DeliveryAccount | OriginalDelivery AccountData | Defines a format for representing a link to original delivery account data corresponding to the message. The original delivery account data can be defined in accordance with an account schema. |
| Message Participants | ParticipantsData | Defines a format for representing a link to contact data corresponding to the message. Contact data can be defined in accordance with a contact schema. The contact data can represent a collection of users who participated in the message exchange. This includes, senders, receivers, people copied (Cc), etc. A participant is a link to the Contact Item representing message sender/receiver. May be left dangling in which case the fields on this type contain all the necessary data about the participant. |
| MessageSentMessage Folder | SentMessage FolderData | Defines a format for representing a link to a folder item corresponding to the message. The folder item can be defined in accordance with a Folder Schema. This field specifies a link to a folder the message can be moved to after being submitted for delivery. |

Depicted in FIG. 2, schema hierarchy 200 includes content schema 216. Content schema 216 includes interrelated fields 217 that define data formats for representing a portion of content associated with a message item. A message item defined in accordance with message schema 212 can include a link to a portion of content (e.g., a body or attachment) defined in accordance with content schema 216. This can be a link to a document, an event, or some other portion of content. A message item can have multiple bodies and/or attachments. For example, a multipart MIME message can contain multiple bodies. More specifically, interrelated fields 217 can define data formats as described in Table 3.

TABLE 3

| Field Name | Field Data Type | Field Description |
| --- | --- | --- |
| ContentMetadata | ContentProperties | Defines a format for representing content properties of a portion of content (e.g., a message body or attachment). ContentProperty types contain fields that describe the content of a message. It is on a relationship between message and item representing content of on extension for attachment. |
| IsAttachment | Booelan | Defines a format for indicating whether the portion of content referred to is a body, or attachment for a message. This field represents what the application thinks this content is as opposed to the ContentDisposition field which is a suggestion from MIME. |
| Order | Int32 | Defines a format for representing an order for the portion of content. This value provides an order to the bodies and attachments. User interfaces should take this value into consideration when displaying the order of the attachments to the user. The first body can be the preferred one. |

Depicted in FIG. 2, schema hierarchy 200 includes attachment schema 218. Attachment schema 218 includes interrelated fields 219 that define data formats for representing an attachment associated with of a message item. An attachment defined in accordance with attachment schema 218 can include a link to a message item defined in accordance with message schema 212. More specifically, interrelated fields 219 can define data formats as described in Table 4.

TABLE 4

| Field Name | Field Data Type | Field Description |
| --- | --- | --- |
| ContentMetadata | ContentProperties | Defines a format for representing content properties of an attachment. ContentProperty types contain fields that describe the attachment. It is on a relationship between message and item representing content on extension for attachment. |
| AttachementState | String | Defines a format for indicating the type and behavior of the attachment. Values can include: 1) EnclosedAttachment: This value indicates an attachment that is stored decoded outside of the Mime. The attachment will behave as if it is enclosed within the Mime Stream. This database Item was created because the data is to be stored in decoded form or the properties need to be schematized. The two most common scenarios that require this are: A. Some protocols will download attachments outside of the MIME content in decoded form. B. The attachment data or meta properties need to be accessible, but this attachment may not behave as if the sender attached this document/file for the recipient to use directly. Examples include: Signature blobs, Inline Only Attachments, Digital Signature certs or data. 2) PromotedAttachment: This attachment is promoted to act like a peer of the message. It will appear in the shell along side the message. 3) SavedAsAttachment: This attachment has be |

TABLE 4-continued

| Field Name | Field Data Type | Field Description |
| --- | --- | --- |
| | | 'Saved As', so it will act as a copy of the message. |
| Is Encrypted | Boolean | Defines a format for indicating if the attachment is encrypted. |
| IsPinned | Boolean | Defines a format for indicating if the attachment is pinned, meaning it will continue to exist when the message is deleted. If the attachment is not pinned, the following can happen:<br>1. When the Message is deleted, the Attachment is deleted. (The destination of the AttachmentInformation.Attachment link.)<br>2. When the Attachment item is deleted, any information or metadata associated with the Attachment is deleted from the message. (To save space or for privacy) |
| IsRead | Boolean | Defines a format for indicating if a message linked to the attachment has been marked as read by the user. |
| IsSigned | Boolean | Defines a format for indicating if a message linked to the attachment is signed. |
| IsTrusted | Booelan | Defines a format for indicating if a message linked to the attachment has satisfied the user's security preferences to appear along with their other files. If security preferences are satisfied, the attachment has met the user's criteria to not need to display warning user interface. The criteria could be: the attachment content, the sender is approved, or user interface as already been displayed. On the other hand, if security preferences are not satisfied, a security preferences warning user interface should be shown to the user before the attachment is opened. This will inform the user that the content could have came from an untrusted source and may contain harmful contents. |
| LastActionTaken | String | Defines a format for representing the last action taken on a message linked to the attachment. Possible values are: Replied and Forwarded. |
| LastActionTime | DateTime | Defines a format for representing the date and time the last action was taken on a message linked to the attachment. |
| LastActionType | String | Defines a format for representing the type of last action taken on one a message linked to the attachment. Should be interpreted together with LastActionTaken. Examples are: Fax or Email to mark that we replied by fax or email. |
| Priority | String | Defines a format for representing the priority of a message linked to the attachment. Attachment priority for delivery can be set by application. Possible Values: AboveNormal, Normal, BelowNormal. Higher values indicate that a transport should deliver attachment sooner than items of a lower level. |
| SendStatus | String | Defines a format for representing the send status of the attachment. For example, a UI can mark the attachment "ToSend" for transports to pick up. A UI can mark the attachment as "Sending" indicating a transition from "ToSend" to "Sending" so other transports won't also attempt to send the message. A UI can mark an attachment as "Sent": The transport transitions from "Sending" to "Sent" after the send is complete. |
| Size | Int64 | Defines a format for representing the size of a message (including attachments) linked to the attachment. |
| Subject | String | Defines a format for representing the subject of a message linked to the attachment. For example, one line that describes attachment. |
| TimeReceived | DateTime | Defies a format for representing the date and time the attachment was delivered. The TimeReceived property describes the time a message linked to the attachment was received by the server, rather than the time the attachment was downloaded from the server and |

TABLE 4-continued

| Field Name | Field Data Type | Field Description |
|---|---|---|
| | | placed in the local database store. This value can be omitted on draft messages and retained copied of send messages. |
| TimeSent | DateTime | Defines a format for representing the date and time a message linked to the attachment was submitted. On draft messages this value can be missing - it will be set when the message is submitted. |
| Type | String | Defines a format for representing the type of a message linked to the attachment. The type will imply a behavior of the linked message. The application can customize icons and read custom headers based on the attachemnt type. This value can come from the X-MessageType header. |
| Attachment Message | MessageData | Defines a format for representing a link to a message item associated with the attachment. The message item can be defined in accordance with a message schema. |
| Attachment Participants | ParticipantsData | Defines a format for representing a collection of users who participated in this attachment exchange. This includes, senders, receivers, people copied (Cc), etc. |
| AttachmentSaved From | SavedFromData | Defines a format for representing a link to allocation the attachment was saved from. Users may use a User Interface to 'Save As' a copy of the attachment. Doing so can make a copy of the attachment. If this value is included, then the attachment is a 'Saved As' copy of an original attachment. The destination of this link is the original attachment. |
| AttachmentSource | AttachmentSource Data | Defines a format for representing the source of the attachment. If the attachment was composed and this link is has a value, then the link points to the database item where the attachment came from. |

Content metadata (e.g., as defined in accordance with a ContentProperties field) associated with an attachment can indicate properties of the electronic message that included the attachment, such as, for example, the sender, recipients, subject, or data of an electronic message or other properties as defined in a content properties schema. A value of an IsPinned field can indicate if an attachment, for example, defined in accordance with attachment schema 218, is to persist after a corresponding message item is deleted.

Depicted in FIG. 2, schema hierarchy 200 includes content properties schema 224. Content properties schema 224 includes interrelated fields 225 that define data formats for representing content properties. Content properties contain fields that describe the content of a message. Content properties are used on relationships between a message item and a portion of content (e.g., defined in accordance with content schema 216) or on extension for an attachment (e.g., defined in accordance with attachment schema 218). More specifically, interrelated fields 225 can define data formats as described in Table 5.

TABLE 5

| Field Name | Field Data Type | Field Description |
|---|---|---|
| ContentBase | String | Defines a format for representing a content base of the content. ContentID, ContentBase, and ContentLocation allow referencing between MIME sections. This can be used to allow URLs in HTML bodies to reference attached content. |
| ContentDescription | String | Defines a format for representing a description that may accompany the content. For electronic mail messages, this value may have come from the Content-Description: header. Some legacy clients use Content Description for the recommended filename. |
| ContentID | String | Defines a format for representing a content entity ID of the content. Content-ID, Content-Base, and Content-Location allow referencing between MIME sections. This can be used to allow URLs in HTML bodies to reference attached content. |

TABLE 5-continued

| Field Name | Field Data Type | Field Description |
|---|---|---|
| ContentType | String | Defines a format for representing a Content-Type of the content. For electronic mail messages, this can match the Content-Type header field for the MIME section where the attachment came from. For other types of electronic messages, this content type can best match the content of the content. For example: The Content-Type could be 'audio/mp3' and the MesaageContent could point to an Item in a Music schema, or to a .mp3 file containing, or to another Item that stores music data. Thus, the Content-Type give a standard indication of the data. This is a free form string. Applications can put their own types here, not just 'text/html' and other mime content types. |
| ContentTypeParameters | String | Defines a format for representing parameters in the Content-Type header. Parameters are of the format 'attribute = value' and can be separated by a ';'. May contain a filename. |
| IsMacBinary | Booelan | Defines a format for indicating whether the attachment is a Mac Binary. This can facilitate special processing for Mac binaries. |
| MimeURL | String | Defines a format for representing a MIME path. A MimePath: URL of the form: MimePath:///[Level1]:[MultiPart-Type]/[Level2]:[MultiPart-Type]/ . . . /[Leveln]:[MultiPart-Type] |
| SuggestedFileName | String | Defines a format for representing the filename that is recommended to go with the cotnent. The path can be omitted and this may just include the filename. For electronic mail messages, this value may have come from the Content-Type: 'name' parameter or the Content-Disposition-Filename or another location in the original email message. For example: 'Bill in Florida 2004.jpg' |

Figure 3:
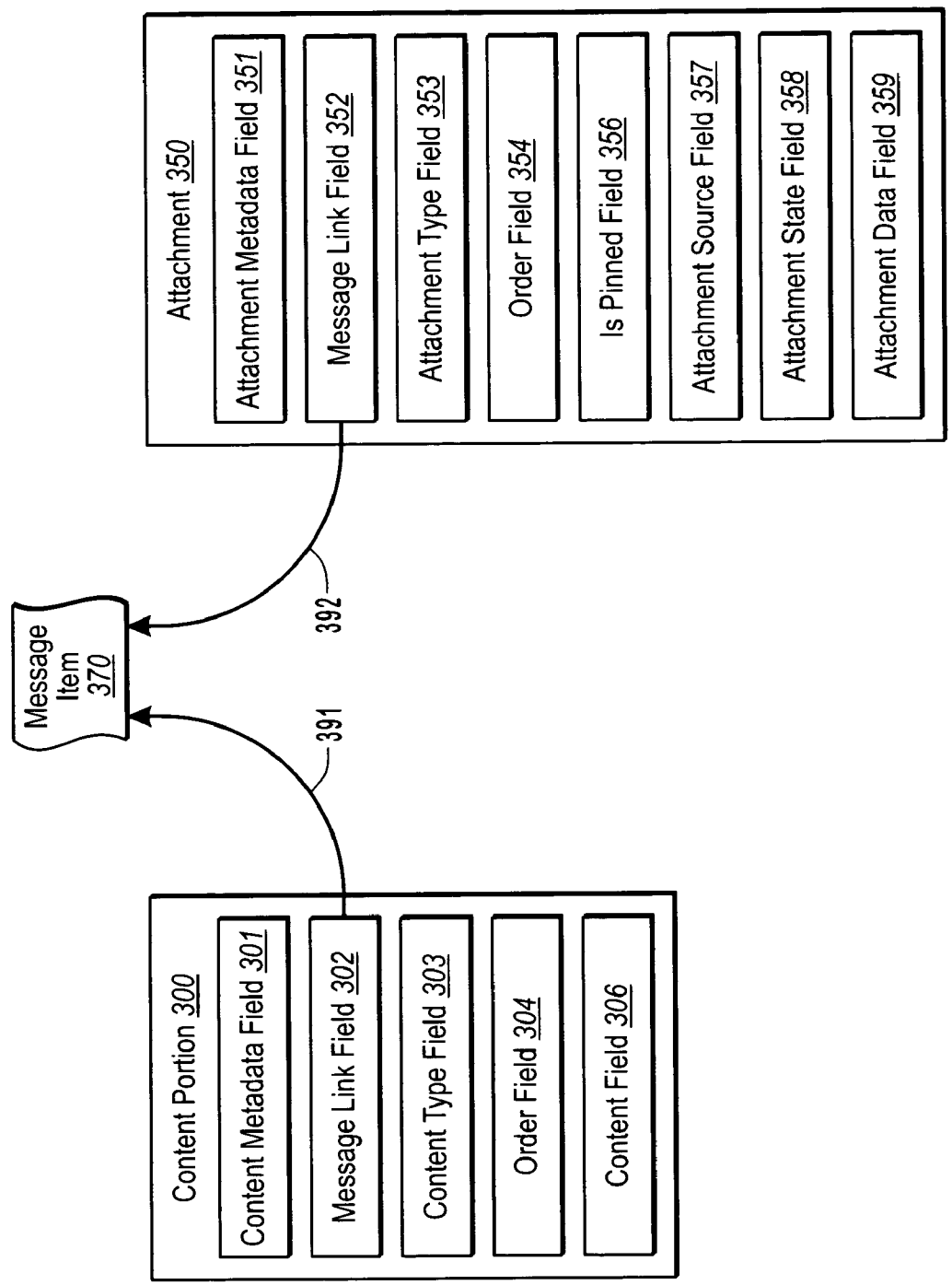
FIG. 3 illustrates an example of a content portion and an attachment linked to a message item in accordance with the principles of the present invention.

FIG. 3 illustrates an example of a content portion 300 and an attachment 350 linked to a message item 370 in accordance with the principles of the present invention. Content portion 300, attachment 350, and message item 370 can be formatted in accordance with schema hierarchy 150 (or the example portion of a more detailed schema hierarchy 200). Content portion 300 can include data fields formatted in accordance with a content schema, such as, for example, content schema 156 or content schema 216. Content metadata field 301 can include one or more fields defined in accordance with a content properties schema, such as, for example, content properties schema 224. Message link field 302 can be assigned a message relationship representing a link from content portion 302 to an electronic message. For example, link 391 represents a link to message item 370. Message item 370 can be a message item defined in accordance with a message schema, such as, for example, message schema 152 or message schema 212.

Content type field 303 can represent a content type corresponding content portion 300. Order field 304 can represent an order corresponding to content portion 300. Content field 308 can represent message data (e.g., a body of an electric mail message) corresponding to content portion 300. Link 391 represents that content field 306 contains a portion of content corresponding to message item 370.

Attachment 350 can include fields formatted in accordance with an attachment schema, such as, for example, attachment schema 157 or attachment schema 218. Attachment metadata field 351 can include one or more fields defined in accordance with a content properties schema, such as, for example, content properties schema 224. It may also be that attachment metadata field includes or more fields defined in accordance with a message schema. The one or more fields can store data similar to that stored in message item 370. Thus, if attachment 350 persists after message item 370 is deleted (and content portion 300 is deleted), attachment 350 may be identified in response to a message related query that would have identified message item 370 if message 370 had not been deleted. Accordingly, a user may be provided with an attachment context (e.g., who sent the attachment, when was the attachment received, etc.) even if the electronic message containing such information has been deleted.

Message link field 352 can be assigned a message relationship representing a link from message attachment 350 to an electronic message. For example, link 392 represents a link to message item 370. Attachment type field 353 represents the attachment type (e.g. word processing document, music document, etc.) Order field 354 can represent an order corresponding to attachment 350. IsPinned field 356 represents whether attachment 350 is coupled to or decoupled from message item 370. When attachment 350 is decoupled from message item 370, attachment 350 can persist after message item 370 is deleted. On the other hand, when attachment 350 is coupled to message item 370, attachment 350 can be deleted along with content portion 300 when message item 370 is deleted.

Attachment source field 357 can be assigned a relationship representing a link to a database item where the message attachment 350 was accessed. Attachment state field 358 represents the state of attachment 350. Attachment data field 359 can represent attachment data (e.g., the contents of an MP3 document) corresponding to message attachment 350. Link 392 can represent that attachment data field 359 contains data that corresponds to message item 370.

Figure 4:
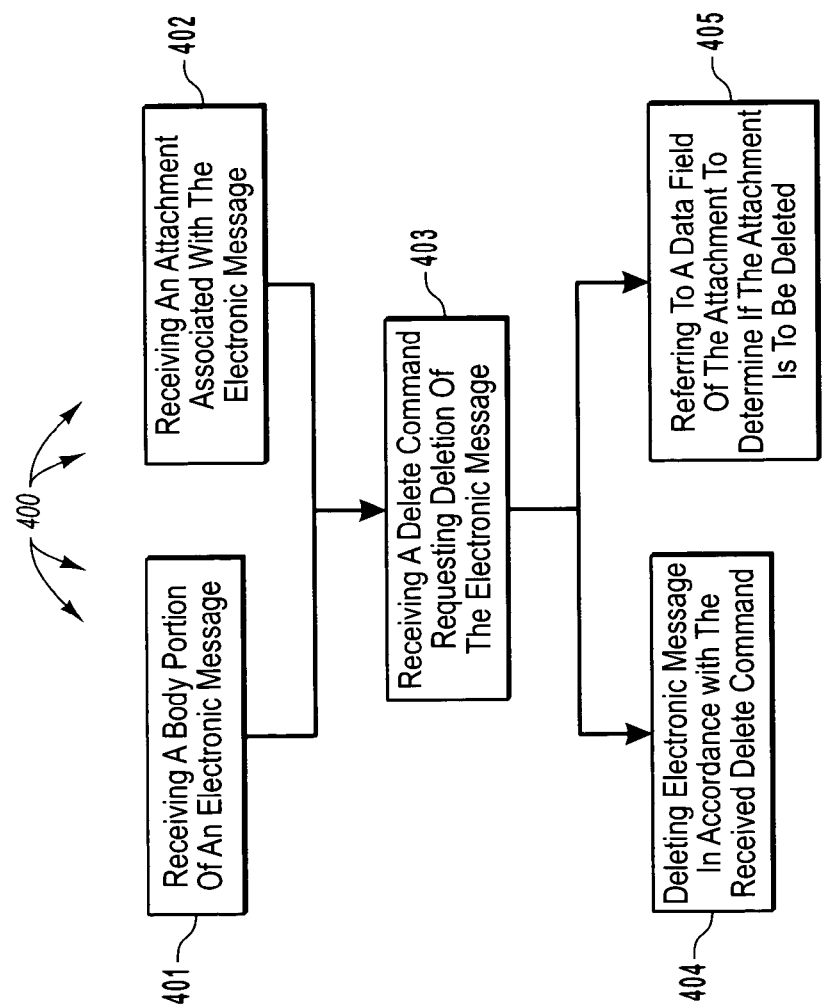
FIG. 4 illustrates an example flowchart of a method for determining if an attachment is to be deleted in response to a deletion command requesting deletion of a corresponding electronic message in accordance with the principles of the present invention.

FIG. 4 illustrates an example flowchart of a method 400 for determining if an attachment is to be deleted in response to a deletion command requesting deletion of a corresponding electronic message. The method of FIG. 4 will be described with respect to the components of network architecture 100 and the data structures of FIG. 3. The method 400 includes an act of receiving a body portion of an electronic message (act 401). Act 401 can include a computer system receiving a body portion on an electronic message. For example, computer system 109 can receive content portion 300 that is linked to message item 370.

The method 400 includes an act of receiving an attachment associated with the electronic message (act 402). Act 402 can include a computer system receiving an attachment associated with an electronic message. For example, computer system 109 can receive attachment 350 that is linked to message item 370.

It may be that a portion of content and an attachment are both included in a received electronic message. For example, computer system 109 can receive message item 170, which includes content 171 and attachment 172. Content 171 can be content that is linked to message item 170 by a value in a corresponding message link field (e.g., similar to message link field 302.) Likewise, attachment 172 can be an attachment that is linked to message item 170 by a value in a corresponding message link field (e.g., similar to message link field 352).

Message item 170 can be defined in accordance with a message schema, such as, for example, message schema 152 or message schema 212. Thus, message item 170 can have one or more fields in common with other message items stored in message silo 184. Message item 170 can also be defined in accordance with one or more extension schemas that facilitate compatibility with specific message protocols and/or message applications. Thus, message item 170 can also have one or more fields that differ from other message items stored in message silo 184.

It may be that attachment 172 includes an attachment metadata field (e.g., similar to attachment metadata field 351). On the other hand, it may be that attachment 172 does not include an attachment metadata field. Accordingly, application 111 can append an attachment metadata field to attachment 172. Application 111 can retrieve values from data fields of message item 170 and/or content 171 and populate an attachment metadata field with the retrieved values. Thus, attachment 172 may include values for properties of message item 170.

Computer system 109 can store different components of message item 170 in appropriate silos of database 114. For example, application 111 can store message item 170 and content 171 in message silo 184 and can store attachment 172 in document silo 186. Appropriate values in message link fields can cause message 170 and content 171 to be associated with attachment 172 even though message 170 and content 171 are stored in message silo 184 and attachment 172 is stored in document silo 186.

The method 400 includes an act of receiving a delete command requesting deletion of the electronic message (act 403). Act 403 can include a computer system receiving a delete command requesting deletion of the electronic message. For example, computer system 109 can receive delete command 174 (requesting deletion of message item 170) from computer system 102. Delete command 174 can be generated in response to user input received at message application 104 (e.g., an electronic mail user interface).

The method 400 includes an act of deleting the electronic message in accordance with the received delete command (act 404). Act 404 can include a computer system deleting the electronic message in accordance with the received delete command. For example, application 111 can delete message item 170 and content 171 from message silo 184 in accordance with delete command 174.

The method 400 includes an act of referring to a data field of the attachment to determine if the attachment is to be deleted (act 405). Act 405 can include a computer system referring to a data field of the attachment to determine if the attachment is to be deleted. For example, application 111 can refer to an IsPinned field of attachment 172 to determine if the attachment is to be deleted. When a value of the IsPinned field indicates attachment 172 is coupled to message item 170 (e.g., a FALSE value), attachment 172 can be deleted in accordance with delete command 174. On the other hand, when a value of the IsPinned field indicates attachment 172 is decoupled from message item 170 (e.g., a TRUE value), attachment 172 is not deleted. Accordingly, attachment 172 can persist after message item 170 and content 171 are deleted (even if attachment 172 has never expressly been saved).

Figure 5:
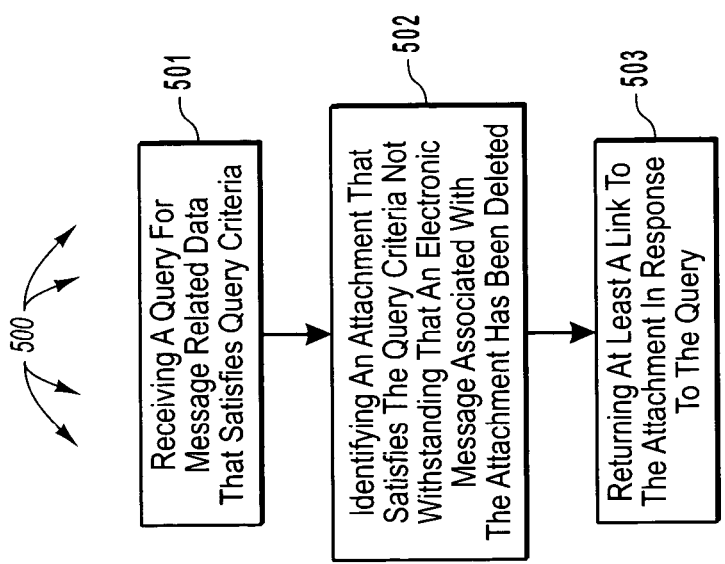
FIG. 5 illustrates an example flowchart of a method for returning an attachment in response to a message related query even though an electronic message corresponding to the attachment no longer exists in accordance with the principles of the present invention.

FIG. 5 illustrates an example flowchart of a method 500 for identifying an attachment in response to a message related query even though an electronic message corresponding to the attachment no longer exists. The method of FIG. 5 will be described with respect to the component of network architecture 100 and the data structures of FIG. 3. The method 500 includes an act of receiving a query for message related data that satisfies query criteria (act 501). Act 501 can include a computer system receiving a query for message related data that satisfies query criteria.

For example, computer system 109 can receive query 176 from computer system 102. Query 176 can be caused by user-input received at message application 104. A query can be a query for values of message item data fields (e.g., participants, subject, etc.). For example, a query can query for data field values of message items stored in message silo 184. Similarly, a query can query for attachments associated with a message item. For example, a query can query for data field values of documents stored in document silo 186. A query can query data fields that are common to a plurality of different types of electronic messages, such as, for example, data fields common to electronic mail messages, instant messages, voice mail messages, fax messages, news group postings, and blog entries.

When appropriate, message application 111 can convert query 176 into an appropriate database access command. Computer system 109 can then submit the database access command to database 114. The database access command can include appropriate database instructions for implementing query 176.

The method 500 includes an act of identifying an attachment that satisfies the query criteria not withstanding that an electronic message associated with the attachment has been deleted (act 502). Act 502 can include a computer system identifying an attachment that satisfies the query criteria not withstanding that an electronic message associated with the attachment has been deleted. For example, application 111 can identify that attachment 172 satisfies the query criteria of query 176 even if message item 170 and content 171 have been deleted. Application 111 can compare values of query criteria to values in an attachment metadata field (e.g., similar to attachment metadata field 351) to make such a determination. For example, application 111 may determine that a subject value (e.g., representing the subject of a deleted electronic message) in an attachment metadata field satisfies query criteria for message related data having a specified subject.

The method 500 includes an act of returning at least a link to the attachment in response to the query (act 503). Act 503 can include a computer system returning at least a link to the attachment in response to the query. For example, computer system 109 can return link 173 to computer system 102 in response to query 176. Link 173 can be a link to attachment 172. Message application 104 can present link 173 (e.g., as an icon or hyperlink) through a user interface at computer system 102. A user can select link 173 (e.g., by clicking on a representative icon or hyperlink) to access attachment 172. Alternately, attachment 172 can be returned and presented at computer system 102 in response to query 176. Thus, an attachment (e.g., attachment 172) can be identified in response to a query even when a corresponding electronic message (e.g., message item 170) no longer exists.

Message application 104 can also present message related data from an attachment metadata field at computer system 102. Presenting message related data from an attachment metadata field can provide a user of computer system 102 with context for a message attachment. For example, a user of computer system 102 can identify an entity that sent attachment 172, when attachment 172 was received, or even the Subject of a deleted electronic message that originally included attachment 172.

Figure 6:
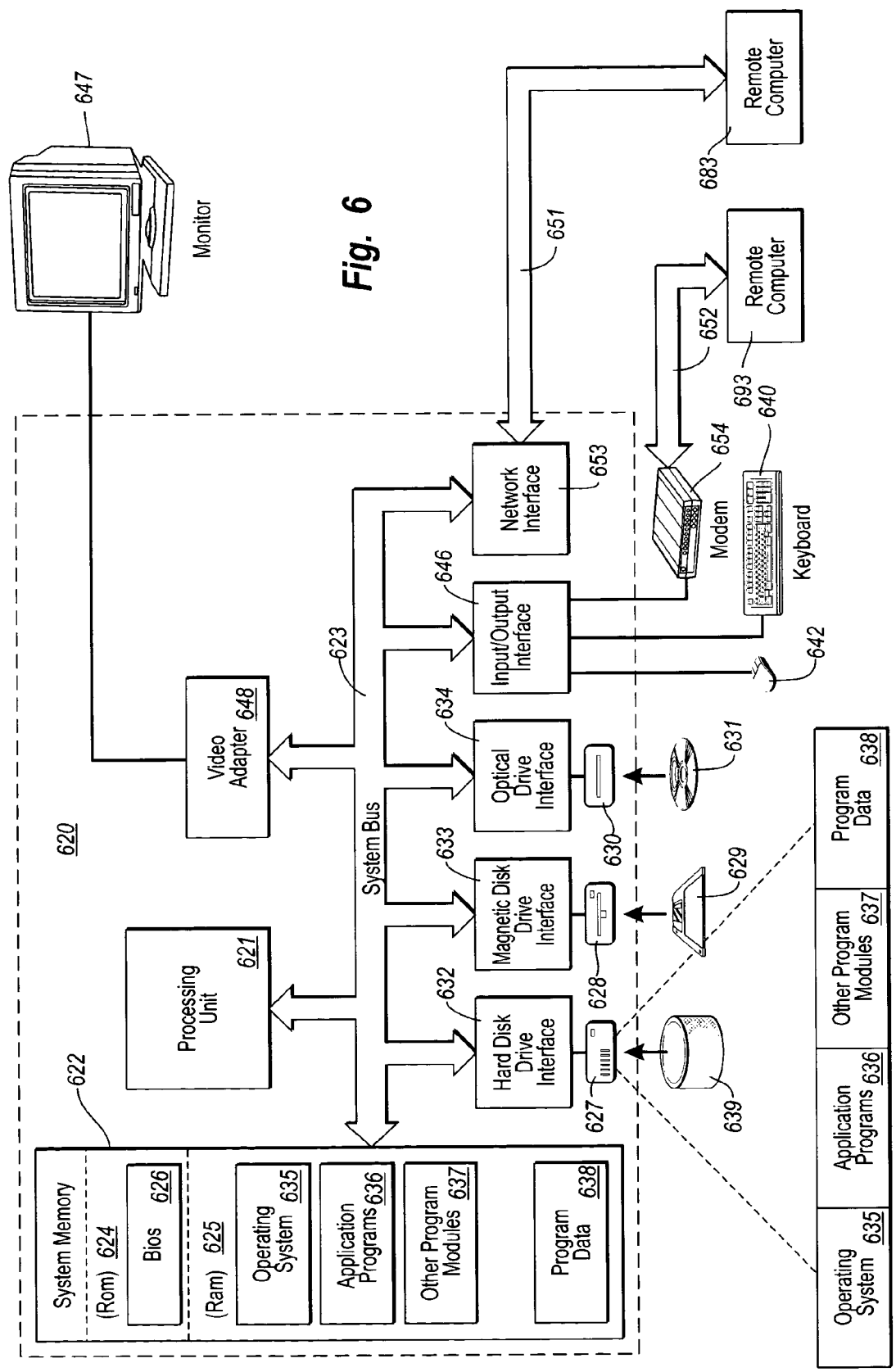
FIG. 6 illustrates a suitable operating environment for the principles of the present invention.

FIG. 6 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 6, an example system for implementing the invention includes a general-purpose computing device in the form of computer system 620, including a processing unit 621, a system memory 622, and a system bus 623 that couples various system components including the system memory 622 to the processing unit 621. Processing unit 621 can execute computer-executable instructions designed to implement features of computer system 620, including features of the present invention. The system bus 623 may be any of several types of bus structures including a memory bus or memory controller, a peripheral bus, and a local bus using any of a variety of bus architectures. The system memory includes read only memory ("ROM") 624 and random access memory ("RAM") 625. A basic input/output system ("BIOS") 626, containing the basic routines that help transfer information between elements within computer system 620, such as during start-up, may be stored in ROM 624.

The computer system 620 may also include magnetic hard disk drive 627 for reading from and writing to magnetic hard disk 639, magnetic disk drive 628 for reading from or writing to removable magnetic disk 629, and optical disk drive 630 for reading from or writing to removable optical disk 631, such as, or example, a CD-ROM or other optical media. The magnetic hard disk drive 627, magnetic disk drive 628, and optical disk drive 630 are connected to the system bus 623 by hard disk drive interface 632, magnetic disk drive-interface 633, and optical drive interface 634, respectively. The drives and their associated computer-readable media provide non-volatile storage of computer-executable instructions, data structures, program modules, and other data for the computer system 620. Although the example environment described herein employs magnetic hard disk 639, removable magnetic disk 629 and removable optical disk 631, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 639, magnetic disk 629, optical disk 631, ROM 624 or RAM 625, including an operating system 635, one or more application programs 636, other program modules 637, and program data 638. A user may enter commands and information into computer system 620 through keyboard 640, pointing device 642, or other input devices (not shown), such as, for example, a microphone, joy stick, game pad, scanner, or the like. These and other input devices can be connected to the processing unit 621 through input/output interface 646 coupled to system bus 623. Input/output interface 646 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 647 or other display device is also connected to system bus 623 via video interface 648. Speakers or other audio output device is also connected to system bus 623 via an audio interface. Other peripheral output devices (not shown), such as, for example, printers, can also be connected to computer system 620.

Computer system 620 is connectable to networks, such as, for example, an office-wide or enterprise-wide computer network, a home network, an intranet, and/or the Internet. Computer system 620 can exchange data with external sources, such as, for example, remote computer systems, remote applications, and/or remote databases over such networks.

Computer system 620 includes network interface 653, through which computer system 620 receives data from external sources and/or transmits data to external sources. As depicted in FIG. 1, network interface 653 facilitates the exchange of data with remote computer system 683 via link 651. Network interface 653 can logically represent one or more software and/or hardware modules, such as, for example, a network interface card and corresponding Network Driver Interface Specification ("NDIS") stack. Link 651 represents a portion of a network (e.g., an Ethernet segment), and remote computer system 683 represents a node of the network.

Likewise, computer system 620 includes input/output interface 646, through which computer system 620 receives data from external sources and/or transmits data to external sources. Input/output interface 646 is coupled to modem 654 (e.g., a standard modem, a cable modem, or digital subscriber line ("DSL") modem), through which computer system 620 receives data from and/or transmits data to external sources. As depicted in FIG. 1, input/output interface 646 and modem 654 facilitate the exchange of data with remote computer system 693 via link 652. Link 652 represents a portion of a network and remote computer system 693 represents a node of the network.

While FIG. 6 represents a suitable operating environment for the present invention, the principles of the present invention may be employed in any system that is capable of, with suitable modification if necessary, implementing the principles of the present invention. The environment illustrated in FIG. 6 is illustrative only and by no means represents even a small portion of the wide variety of environments in which the principles of the present invention may be implemented.

In accordance with the present invention, message applications as well as associated data, including schemas, message items, attachments, message silos, and document silos may be stored and accessed from any of the computer-readable media associated with computer system 620. For example, portions of such modules and portions of associated program data may be included in operating system 635, application programs 636, program modules 637 and/or program data 638, for storage in system memory 622.

When a mass storage device, such as, for example, magnetic hard disk 639, is coupled to computer system 620, such modules and associated program data may also be stored in the mass storage device. In a networked environment, program modules depicted relative to computer system 620, or portions thereof, can be stored in remote memory storage devices, such as, system memory and/or mass storage devices associated with remote computer system 683 and/or remote computer system 693. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computer system that is network connectable along with one or more other computer systems to a network, a method for determining if an attachment is to be deleted in response to a deletion command requesting deletion of a corresponding electronic message, the method comprising:
   an act of receiving an electronic message, the electronic message including:
      a message body;
      an attachment attached to the message body, the attachment storing attachment data associated with the electronic message; and
      a coupling field indicating if the attachment data—is coupled to or decoupled from the message body, coupling to the message body indicating that the attachment data is to be deleted along with the message body when the message body is deleted, decoupling from the message body indicating that the attachment data is to be retained when the electronic message is deleted;
   an act of storing the message body in a message silo of a database, the message body being stored along with one or more other message items defined in accordance with a message schema;
   an act of storing the attachment in a document silo of the database;
   an act of maintaining a link between the attachment in the document silo and the electronic message in the message silo such that the message body and the attachment remain related as electronic message data even though they are stored in different silos;
   an act of receiving a delete command requesting deletion of the electronic message;
   an act of deleting the message body in response to and in accordance with the received delete command;
   an act of automatically referring to the coupling field included in the electronic message in response to the delete command to determine if the attachment data is to be deleted along with the message body or if the attachment data is to be retained based on whether the attachment data is coupled to or decoupled from the message body respectively; and
   an act of processing the attachment data in accordance with the indication in the coupling field included in the electronic message based on the reference to the coupling field included in the electronic message.

2. The method as recited in claim 1, wherein the act of receiving an electronic message comprises an act of receiving electronic message selected from among an electronic mail message, an instant message, a fax message, a news group posting, a voice message, and a blog entry.

3. The method as recited in claim 1, wherein the act of receiving electronic message comprises an act of receiving an electronic message defined in accordance with one or more extension schemas.

4. The method as recited in claim 1, wherein the attachment attached to the electronic message includes an attachment metadata field, the attachment metadata field storing message related data associated with the electronic message such that if the electronic message is deleted message related data associated the electronic message can nonetheless be returned in response to a query.

5. The method as recited in claim 1, wherein the act of receiving a delete command requesting deletion of the electronic message comprises an act of receiving a delete command that originated at a user message application.

6. The method as recited in claim 1, wherein the act of deleting the electronic message in accordance with the received delete command comprises an act of deleting the message body from a message silo of a database.

7. The method as recited in claim 1, wherein the act of referring to the coupling field included in the electronic message to determine if the attachment is to be deleted comprises an act of referring to the coupling field to determine that the attachment is to be retained in response to the delete command.

8. The method as recited in claim 1, wherein the act of referring to the coupling data field included in the electronic message to determine if the attachment is to be deleted comprises an act of referring to the coupling field to determine that the attachment is to be deleted along with the message body in response to the delete command.

9. The method as recited in claim 7, wherein:
   the act of deleting the message body in response to and in accordance with the received delete command comprise an act of deleting the message body from a message silo of a database in response to the delete command; and
   the act of processing the attachment data in accordance with the indication in the coupling field of the electronic message based on the reference to the coupling field comprises an act of retaining the attachment in a document silo of the database based on the reference to the coupling field.

10. The method as recited in claim 1, wherein the coupling field being included in the electronic message comprises the coupling field being included in the attachment.

11. In a computer system that is network connectable along with one or more other computer systems to a network, a method for identifying an attachment in response to a message related query, the method comprising:

an act of receiving an electronic message, the electronic message including:
- a message body;
- an attachment attached to the message body, the attachment storing attachment data associated with the electronic message; and
- a coupling field indicating that the attachment data is decoupled from the message body, decoupling from the message body indicating that the attachment data is to be retained when the electronic message is deleted;

an act of storing the message body in a message silo of a database, the message body being stored along with one or more other message items defined in accordance with a message schema;

an act of storing the attachment in a document silo of the database;

an act of maintaining a link between the attachment in the document silo and the electronic message in the message silo such that the message body and the attachment remain related as electronic message data even though they are stored in different silos;

an act of receiving a delete command to delete the electronic message;

in response to the delete command:
- an act of deleting the message body; and
- an act of retaining the attachment based on the indication in the coupling field included in the electronic message;

an act of receiving a query for message related data that satisfies query criteria subsequent to deletion of the message body;

an act of identifying the retained attachment as message related data that satisfies the query criteria not withstanding that the message body was deleted prior to receiving the query; and an act of returning at least a link to the attachment in response to the query.

12. The method as recited in claim 11, wherein the act of receiving a query for message related data that satisfies query criteria comprises an act of receiving a query that originated at a user message application.

13. The method as recited in claim 11, wherein the act of returning at least a link to the attachment in response to the query comprises an act of returning a link that can be represented by an icon or hyperlink at a user message application.

14. The method as recited in claim 11, wherein the act of returning at least a link to the attachment in response to the query comprises an act of returning the attachment in response to the query.

15. A computer program product for use in a computer system that is network connectable along with one or more other computer systems to a network, the computer program product for determining if an attachment is to be deleted in response to a deletion command requesting deletion of a corresponding electronic message, the computer program product comprising one or more physical storage media having stored thereon computer-executable instructions that, when executed by a processor, cause the computer system to perform the following:

receive an electronic message, the electronic message including
- a message body;
- an attachment attached to the message body, the attachment storing attachment data associated with the electronic message; and
- a coupling field indicating if the attachment data is coupled to or decoupled from the message body, coupling to the message body indicating that the attachment data is to be deleted along with the message body when the message body is deleted, decoupling from the message body indicating that the attachment data is to be retained when the electronic message is deleted;

store the message body in a message silo of a database, the message body being stored along with one or more other message items defined in accordance with a message schema;

store the attachment in a document silo of the database;

maintain a link between the attachment in the document silo and the electronic message in the message silo such that the message body and the attachment remain related as electronic message data even though they are stored in different silos;

receive a delete command requesting deletion of the electronic message;

delete the message body in response to and in accordance with the received delete command; and refer to the coupling field included in the attachment to determine if the attachment data is to be deleted along with the message body or if the attachment data is to be retained based on whether the attachment data is coupled to or decoupled from the message body in response to receiving the delete command.

16. A computer program product for use in a computer system that is network connectable along with one or more other computer systems to a network, the computer program product for identifying an attachment in response to a message related query, the computer program product comprising one or more physical storage media having stored thereon computer-executable instructions that, when executed by a processor, cause the computer system to perform the following:

receive an electronic message, the electronic message including:
- a message body;
- an attachment attached to the message body, the attachment storing attachment data associated with the electronic message; and
- a coupling field indicating that the attachment data is decoupled from the message body, decoupling from the message body indicating that the attachment data is to be retained when the electronic message is deleted;

store the message body in a message silo of a database, the message body being stored along with one or more other message items defined in accordance with a message schema;

store the attachment in a document silo of the database;

maintain a link between the attachment in the document silo and the electronic message in the message silo such that the message body and the attachment remain related as electronic message data even though they are stored in different silos;

receive a delete command to delete the electronic message;

in response to the delete command:
- delete the message body; and
- retain the attachment;

receive a query for message related data that satisfies query criteria subsequent to deletion of the message body;

identify the attachment as message related data that satisfies the query criteria not withstanding that the message body was deleted prior to receiving the query; and return at least a link to the attachment in response to the query.

* * * * *